(12) United States Patent
Gu

(10) Patent No.: US 8,481,110 B2
(45) Date of Patent: Jul. 9, 2013

(54) METHODS OF MAKING INORGANIC MEMBRANES

(75) Inventor: Yunfeng Gu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 209 days.

(21) Appl. No.: 12/389,911

(22) Filed: Feb. 20, 2009

(65) Prior Publication Data

US 2010/0056369 A1    Mar. 4, 2010

Related U.S. Application Data

(60) Provisional application No. 61/092,969, filed on Aug. 29, 2008.

(51) Int. Cl.
*B05D 7/22*     (2006.01)
*B01D 53/22*    (2006.01)

(52) U.S. Cl.
USPC ............................. 427/181; 96/11

(58) Field of Classification Search
USPC ............... 96/4, 11; 423/625; 427/181
See application file for complete search history.

(56) References Cited

U.S. PATENT DOCUMENTS

| | | | |
|---|---|---|---|
| 4,711,719 A | 12/1987 | Leenaars et al. | 210/500.26 |
| 4,929,406 A | 5/1990 | Abe et al. | 264/45.5 |
| 4,971,696 A | 11/1990 | Abe et al. | 210/500.25 |
| 6,464,881 B2 | 10/2002 | Thoraval | 210/652 |
| 7,179,325 B2 | 2/2007 | Oyama et al. | 96/11 |
| 2003/0222015 A1 | 12/2003 | Oyama et al. | |
| 2005/0172811 A1* | 8/2005 | Oyama et al. | 96/4 |
| 2008/0276985 A1* | 11/2008 | Buvat et al. | 136/252 |

FOREIGN PATENT DOCUMENTS

WO    WO2009/058209    5/2009

OTHER PUBLICATIONS

B.E. Yoldas, Alumina sol preparation from alkoxides, Ceram. Bull. 54 (1975) 289.
V.V. Nazarov, O.B. Pavlova-Verevkina, Synthesis and colloid-chemical properties of boehmite hydrosols, Colloid J. 60 (1998) 738.
R.J.R. Uhihorn, M.B.H.J, Huis, In'T Veld, K. Keizer, A.J.Burggraaf, Synthesis of Ceramic Membranes Part I: Synthesis of Non-supported and Supported γ-alumina Membranes without defects, J. Mater. Sci. 27 (1992) 527.
Agrafiotis, et al., *Deposition of meso-porous γ-alumina coating on ceramic honeycombs by sol-gel methods*, Journal of the European Ceramic Society 22 (2002) pp. 423-434.

* cited by examiner

*Primary Examiner* — Stanley Silverman
*Assistant Examiner* — Syed Iqbal
(74) *Attorney, Agent, or Firm* — Michael W. Russell

(57) ABSTRACT

Methods of making inorganic membranes, for example, methods of making gamma-alumina inorganic membranes which can be useful for, for example, molecular level gas separations and/or liquid filtration are described.

20 Claims, 4 Drawing Sheets

METHODS OF MAKING INORGANIC MEMBRANES

This application claims the benefit of priority to U.S. Provisional Patent Application No. 61/092,969 filed on Aug. 29, 2008.

BACKGROUND

1. Field

Embodiments of the invention relate to methods of making inorganic membranes and more particularly to methods of making gamma-alumina inorganic membranes which can be useful for, for example, molecular level gas separations and/or liquid filtration.

2. Technical Background

There are a number of industrial processes, for instance, coal gasification, biomass gasification, steam reforming of hydrocarbons, partial oxidation of natural gas, etc., which produce gas streams that can include $CO_2$, $H_2$ and CO. It is frequently desirable to remove $CO_2$ from those gas mixtures to capture $CO_2$, for example, for sequestration purposes and to produce $H_2$ or $H_2$-enriched gas product.

Membranes made of polymeric materials have been developed and commercially used for molecular separation, such as separating $CO_2$ from natural gas streams. However, polymeric membranes are associated with poor thermal and chemical stability, and their permeation flux is often low. Moreover, hydrocarbons ubiquitously exist in $CO_2$ gas mixtures derived from fossil fuel sources, and these hydrocarbons can cause degradation of the polymeric membranes by dissolution, fouling, etc., further limiting widespread use of polymeric membranes.

Inorganic membranes are an emerging technology area and hold high promise to overcome the thermal and chemical stability issues that are associated with polymeric membrane materials. $CO_2$ separation functions of inorganic membranes, however, have not been well demonstrated yet, perhaps because making a detect-free inorganic membrane in a practical way remains a large material processing challenge.

Inorganic membranes, for example, mesoporous gamma-alumina membranes have potential applications in both liquid filtration and gas molecule separation areas. They are currently commercially available for ultrafiltration and nanofiltration, while they have been investigated as a substrate for deposition of gas molecule selective membranes such as silica. For both applications, it is advantageous to provide a thin membrane without causing pin holes and cracks in order to achieve high permeation flux and/or to lower flow resistance.

In general, coating sols with concentration of boehmite (AlOOH) sol of from 0.5 to 1.0M (from 3 to 6% by weight) are commercially used and the obtained gamma-alumina membranes are typically from 5 to 50 microns (μm) in thickness. Commercially available membranes have a typical thickness of from 10 to 50 μm. Thinner membranes can provide a higher permeability and a lower risk of cracking.

The use of a dilute coating sol can make the membrane thinner, but meanwhile it can cause the sol particles to more easily infiltrate the pores of the support, for example, if the size of the particles is smaller than the pore size of the support. This can lead to a discontinuous coating or even no coating at all. Repeat cycles of coating followed by drying followed by firing could eventually lead to the membrane formation, but could significantly increase manufacturing costs and time. Also, particle infiltration into the support could increase the flow resistance and thus reduce the permeability.

It would be advantageous to have methods of making inorganic membranes with improved particle size control, membrane formation, and/or increased permeability.

SUMMARY

One embodiment of the invention is a method comprising providing an inorganic porous support comprising a first end, a second end, and a plurality of inner channels having surfaces defined by porous walls and extending through the support from the first end to the second end, providing a first mixture comprising boehmite particles, adjusting the particle size of the boehmite particles in the first mixture, and applying the first mixture to the inner channel surfaces of the inorganic porous support to form an inorganic membrane after adjusting the particle size.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings illustrate one or more embodiments of the invention and together with the description serve to explain the principles and operation of the invention.

BRIEF DESCRIPTION OF THE DRAWINGS

The invention can be understood from the following detailed description either alone or together with the accompanying drawing figures.

DETAILED DESCRIPTION

Figure 1:
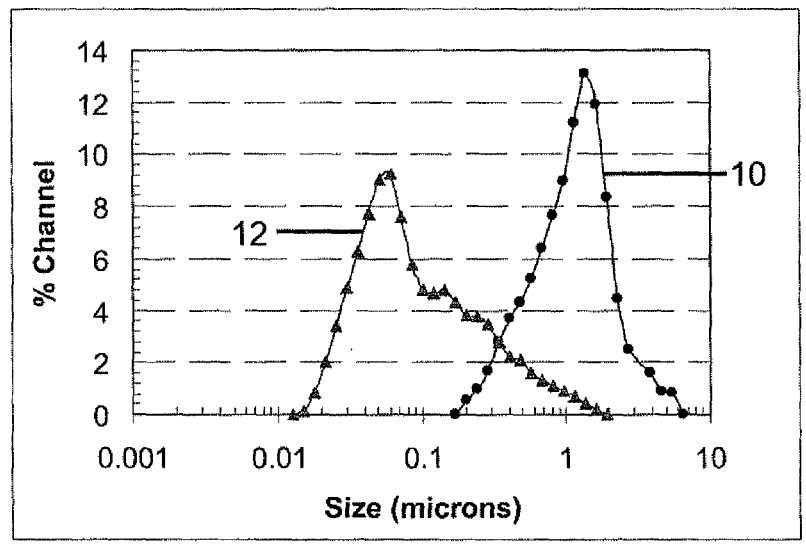
FIG. 1 is a graph showing the particle size distribution of two first mixtures prior to adjusting the particle size.

Reference will now be made in detail to various embodiments of the invention. Wherever possible, the same reference numbers will be used throughout the drawings to refer to the same or like features.

One embodiment of the invention is a method comprising providing an inorganic porous support comprising a first end, a second end, and a plurality of inner channels having surfaces defined by porous walls and extending through the support from the first end to the second end, providing a first mixture comprising boehmite particles, adjusting the particle size of the boehmite particles in the first mixture, and applying the first mixture to the inner channel surfaces of the inorganic porous support to form an inorganic membrane after adjusting the particle size.

According to some embodiments, adjusting the particle size comprises adjusting the median particle size.

Applying the first mixture, in some embodiments, comprises drying and firing the boehmite particles to form gamma-alumina.

The method further comprises, according to another embodiment, providing a second mixture comprising boehmite particles, adjusting the particle size of the boehmite particles in the second mixture, and applying the second mixture to the inorganic membrane after the drying and firing of the boehmite particles in the first mixture and after adjusting the particle size of the boehmite particles in the second mixture. Adjusting the particle size in the second mixture can comprise adjusting the median particle size. The adjusted median particle size of the boehmite particles in the second mixture, in some embodiments, is smaller than the adjusted median particle size in the first mixture.

In some embodiments, the first mixture and the second mixture are the same mixture. In other embodiments the first mixture and the second mixture are different. The differences can be, for example, in particles size, polymer binder, acid for pH adjustment, and/or other parameters described herein.

According to one embodiment, the applying the mixture to the inorganic membrane after the drying and firing and after adjusting the particle size of the boehmite particles in the mixture is repeated one, two, or three additional times. For example, a third, fourth, and or fifth mixture can be used to coat the inorganic membrane which may comprise multiple layers.

The third, fourth, and or fifth mixtures can be the same mixture as any of the preceding mixtures. In other embodiments, the third, fourth, and or fifth mixtures are different than each other and also different from the first mixture and the second mixture. The differences can be, for example, in particles size, polymer binder, acid for pH adjustment, and/or other parameters described herein. For example, the particle size from first mixture through fifth mixture after adjusting the particle size can comprise increasingly smaller particles from first mixture to fifth mixture. In another embodiment, the median particle sizes of the mixtures after adjusting the median particle sizes of all of the mixtures are the same.

In some embodiments, applying the second mixture comprises drying and firing the boehmite particles to form gamma-alumina.

Adjusting the particle size of the boehmite particles in the second mixture, according to one embodiment, comprises controlling the pH value of the second mixture.

In one embodiment, providing the first mixture comprising boehmite particles comprises preparing a sol. Preparing the sol can comprise hydrolysis and condensation.

Adjusting the particle size of the boehmite particles in the first mixture, according to one embodiment, comprises controlling the pH value of the first mixture.

Adjusting the particle size of the boehmite particles in the first mixture comprises, in some instances, combining the first mixture with a polymer binder, a solution comprising a polymer binder, an acid, acetic acid, nitric acid, or a combination thereof. The polymer binder can be selected from polyethylene glycol, polyvinyl alcohol, and combinations thereof. The solution comprising the polymer binder can comprise water, distilled water or a combination thereof.

In some embodiments, the adjusted particle size of the boehmite particles in the first mixture is larger than the pore size of the inorganic porous support.

According to one embodiment, the inorganic porous support is a honeycomb monolith. Honeycomb monoliths can be manufactured, for example, by extruding a mixed batch material through a die to form a green body, and sintering the green body with the application of heat utilizing methods known in the art. In certain embodiments, the inorganic porous support is in the form of ceramic monolith. In certain embodiments, the monolith, for example a ceramic monolith, comprises a plurality of parallel inner channels.

The inorganic porous support can have a high surface area packing density, such as a surface area packing density of greater than 500 $m^2/m^3$, greater than 750 $m^2/m^3$, and/or greater than 1000 $m^2/m^3$.

As noted above, the inorganic porous support comprises a plurality of inner channels having surfaces defined by porous walls. The number, spacing, and arrangement of the inner channels can be selected in view of the potential application of the inorganic membrane. For example, the number of channels can range from 2 to 1000 or more, such as from 5 to 500, from 5 to 50, from 5 to 40, from 5 to 30, from 10 to 50, from 10 to 40, from 10 to 30, etc; and these channels can be of substantially the same cross sectional shape (e.g., circular, oval, square, hexagonal, etc.) or not. The channels can be substantially uniformly dispersed in the inorganic porous support's cross section or not (e.g., as in the case where the channels are arranged such that they are closer to the outer edge of the inorganic porous support than to the center). The channels can also be arranged in a pattern (e.g., rows and columns, offset rows and columns, in concentric circles about the inorganic porous support's center, etc.).

In some embodiments, the inner channels of the inorganic porous support have a hydraulic inside diameter of from 0.5 millimeters (mm) to 3 mm, such as in cases where the inner channels of the inorganic porous support have a hydraulic inside diameter of $1\pm0.5$ mm, $2\pm0.5$ mm, from 2.5 mm to 3 mm, and/or from 0.8 mm to 1.5 mm. In certain embodiments, the inner channels of the inorganic porous support have a hydraulic inside diameter of 3 mm or less, for example less than 3 mm. For clarity, note that "diameter" as used in this context is meant to refer to the inner channel's cross sectional dimension and, in the case where the inner channel's cross section is non-circular, is meant to refer to the diameter of a hypothetical circle having the same cross sectional area as that of the non-circular inner channel.

In some embodiments, the porous walls which define the inner channel surfaces have a median pore size of 25 microns ($\mu m$) or less. In some embodiments, the porous walls which define the inner channel surfaces have a median pore size of from 5 nanometers (nm) to 25 $\mu m$, such as in cases where the porous walls which define the inner channel surfaces have a median pore size of $10\pm5$ nm, $20\pm5$ nm, $30\pm5$ nm, $40\pm5$ nm, $50\pm5$ nm, $60\pm5$ nm, $70\pm5$ nm, $80\pm5$ nm, $90\pm5$ nm, $100\pm5$ nm, $100\pm50$ nm, $200\pm50$ nm, $300\pm50$ nm, $400\pm50$ nm, $500\pm50$ nm, $600\pm50$ nm, $700\pm50$ nm, $800\pm50$ nm, $900\pm50$ nm, $1000\pm50$ nm, $1\pm0.5$ $\mu m$, and/or $2\pm0.5$ $\mu m$. In other embodiments, the inner channel surfaces have a median pore size of from 5 $\mu m$ to 15 $\mu m$.

The porous walls which define the inner channel surfaces, according to some embodiments, have a median pore size of 1 $\mu m$ or less. In some embodiments, the porous walls which define the inner channel surfaces have a median pore size of 500 nm or less, such as in cases where the porous walls which define the inner channel surfaces have a median pore size of from 5 nm to 500 nm, from 5 nm to 400 nm, from 5 nm to 300 nm, from 5 nm to 400 nm, from 5 nm to 300 nm, from 5 nm to 400 nm, from 5 nm to 200 nm, from 5 nm to 100 nm, from 5 nm to 50 nm, etc. For clarity, note that "size" as used in this context is meant to refer to a pore's cross sectional diameter and, in the case where the pore's cross section is non-circular, is meant to refer to the diameter of a hypothetical circle having the same cross sectional area as that of the non-circular pore.

The porous walls which define the inner channel surfaces, according to some embodiments, have a median pore size of 1 µm or less. In some embodiments, the porous walls which define the inner channel surfaces have a median pore size of 500 nm or less, such as in cases where the porous walls which define the inner channel surfaces have a median pore size of from 10 nm to 500 nm, from 10 nm to 400 nm, from 10 nm to 300 nm, from 10 nm to 400 nm, from 10 nm to 300 nm, from 10 nm to 400 nm, from 10 nm to 200 nm, from 10 nm to 100 nm, from 10 nm to 50 nm, etc. For clarity, note that "size" as used in this context is meant to refer to a pore's cross sectional diameter and, in the case where the pore's cross section is non-circular, is meant to refer to the diameter of a hypothetical circle having the same cross sectional area as that of the non-circular pore.

According to some embodiments, the inorganic porous support has a porosity of from 20 percent to 80 percent, such as a porosity of from 30 percent to 60 percent, from 50 percent to 60 percent, or from 35 percent to 50 percent. When a metal, such as stainless steel, is used as the inorganic porous support, porosity in the stainless steel support can be affected, for example, using engineered pores or channels made by three-dimensional printing, by high energy particle tunneling, and/or by particle sintering using a pore former to adjust the porosity and pore size.

To allow for more intimate contact between a fluid stream flowing through the support and the coated support itself, for example when used in a separation application, it is desired in certain embodiments that at least some of the channels are plugged at one end of the support, while other channels are plugged at the other end of the support. In certain embodiments, it is desired that at each end of the support, the plugged and/or unplugged channels form a checkerboard pattern with each other. In certain embodiments, it is desired that where one channel is plugged on one end (referred to as "the reference end") but not the opposite end of the support, at least some, for example a majority, of the channels (preferably all of the channels in certain other embodiments) immediately proximate thereto (those sharing at least one wall with the channel of concern) are plugged at such opposite end of the support but not on the reference end.

It will be appreciated that individual inorganic porous supports can be stacked or housed in various manners to form larger inorganic porous supports having various sizes, service durations, and the like to meet the needs of differing use conditions.

Suitable inorganic porous support materials include ceramics, glass ceramics, glasses, metals, and combinations thereof. Examples of these and other materials from which the inorganic porous support can be made or which can be included in the inorganic porous support are, illustratively: metal oxide, alumina (e.g., alpha-aluminas, delta-aluminas, gamma-aluminas, or combinations thereof), cordierite, mullite, aluminum titanate, titania, zeolite, metal (e.g., stainless steel), ceria, magnesia, talc, zirconia, zircon, zirconates, zirconia-spinel, spinel, silicates, borides, alumino-silicates, porcelain, lithium alumino-silicates, feldspar, magnesium alumino-silicates, and fused silica.

The inorganic porous support, in some embodiments, comprises a material selected from alumina, alpha-alumina, gamma-alumina, zirconia, ceria, titania, mullite, cordierite, perovskite, stainless steel, and combinations thereof.

In one embodiment, the inorganic porous support is a glass. In another embodiment, the inorganic porous support is a glass-ceramic. In another embodiment, the inorganic porous support is a ceramic. In another embodiment, the inorganic porous support is a metal.

In another embodiment, the inorganic porous support comprises at least one inorganic porous intermediate layer on the inner channel surfaces. In this instance, the inorganic membrane coats the surface of the at least one inorganic porous intermediate layer. It will be appreciated that the "surface of the at least inorganic porous intermediate layers" refers to the outer surface of the intermediate layer (i.e., the surface that is exposed to the channel) or, in the case where there is more than one porous intermediate layer, to the outer surface of the outermost intermediate layer (i.e., the intermediate layer most distant from the inner channel surfaces of the inorganic porous support). In particular, the phrase "the inorganic membrane coats the surface of the at least one inorganic porous intermediate layer" is not meant to be construed as requiring that the inorganic membrane coat every inorganic porous intermediate layer or every side of every inorganic porous intermediate layer.

Whether or not to employ the at least one inorganic porous intermediate layer can depend on a variety of factors, such as the nature of the inorganic porous support; the median diameter of the inorganic porous support's inner channels; the use to which the inorganic membrane is to be put and the conditions (e.g., gas flow rates, gas pressures, etc.) under which it will be employed; the roughness or smoothness of the inner channel surfaces; the median pore size of the porous walls which define the inner channel surfaces; and the like.

The at least one inorganic porous intermediate layer can be used to increase the smoothness of the surface onto which the inorganic membrane is coated, for example, to improve flow of a gas that may pass through the channels; to improve uniformity of the inorganic membrane; to decrease the number and/or size of any gaps, pinholes, or other breaks in the inorganic membrane; to decrease the thickness of the inorganic membrane needed to achieve an acceptable coverage (e.g. a minimal number of gaps, pinholes, or other breaks). Additionally or alternatively, the inorganic porous intermediate layer(s) can be used to decrease the effective diameter of the inorganic porous support's inner channels. Still additionally or alternatively, the inorganic porous intermediate layer(s) can be used to alter the chemical, physical, or other properties of the surface onto which the inorganic membrane is coated.

Illustratively, in some embodiments, the porous walls of the inorganic porous support have a median pore size of from 5 nm to 100 nm, for example, 10 nm to 100 nm (e.g., from 5 nm to 50 nm), the inorganic porous support does include the at least one inorganic porous intermediate layer, and the inorganic membrane coats the inner channel surfaces of the inorganic porous support.

In other embodiments, the porous walls of the inorganic porous support have a median pore size of from 100 nm to 25 µm (e.g., from 100 nm to 15 µm or from 5 µm to 15 µm), the inorganic porous support comprises the at least one inorganic porous intermediate layers, and the inorganic membrane coats the surface of the at least one inorganic porous intermediate layers.

In other embodiments, the porous walls of the inorganic porous support have a median pore size of from 100 nm to 25 μm (e.g., from 100 nm to 15 μm or from 5 μm to 15 μm), the inorganic porous support does not comprise the at least one inorganic porous intermediate layers.

In some embodiments, the at least one inorganic porous intermediate layer comprises alpha-alumina, zirconia, titania, ceria, mullite, cordierite, perovskite, or combinations thereof.

The adjusted median particle size of the boehmite particles in the first mixture, in some embodiments, is larger than the median pore size of the at least one inorganic porous intermediate layer.

In some embodiments, the first mixture has a sol concentration of from 0.1 to 0.4M which is defined as from 0.1 to 0.4 moles of Al(OOH) per liter solution in case of making gamma-alumina membrane product.

In one embodiment, the first mixture comprises large boehmite particles, for example, aggregate particles, with a median particle size of from 1 to 5 times, for example, 3 times the median pore size of the inorganic porous support which the membrane is coated on.

Particle size can be adjusted, in some embodiments with the addition of a polymer binder such as PEG or PVA, and some amount of acid used for adjusting the pH value of the first mixture. The pH value and polymer binder can have a direct influence both on the aggregate particle size of the sol and inorganic membrane formation.

According to another embodiment, the first mixture comprises fine boehmite particles with a median particle size smaller than median pore size of the support.

The inorganic membrane, in one embodiment, has a thickness of from 0.3 to 5 μm, for example, from 0.5 to 2 μm.

Large aggregate boehmite particles in the first mixture can be obtained by careful control in both the original sol synthesis and subsequent particle size adjustment. The key parameters in the original sol synthesis are the hydrolysis time and the mole ratio of acid to alkoxide, while the key parameters in adjusting the particle size include the pH value and the polymer binder type.

The original boehmite sols with different boehmite particle sizes can be obtained by hydrolysis and condensation of aluminum alkoxide (aluminum tri-sec-butoxide, aluminum isopropoxide, etc.) with precise use of hydrolysis time and the ratio of peptization acid (nitric acid, hydrochloride acid or acetic acid) to alkoxide.

In some embodiments, 0.4 mol of aluminum isopropoxide is added into 600 ml of D.I. water which is heated to a temperature of 80° C. The mixture is stirred for from 0.5 h to 24 h for the hydrolysis of the isopropoxide and the formation of a boehmite precipitate. The precipitate is then heated to a temperature of 92° C. and is peptized using a quantity of acetic acid or nitric acid with mole ratio of $H^+$/alkoxide of 0.04 or 0.13. The solution is refluxed at a temperature of from 90 to 95° C. for 20 h to get a clear or slightly translucent sol. This is referred to as the first mixture or original sol.

In some embodiments, the first mixture of large particles is made with a 24 h hydrolysis time and peptization uses acetic acid at the mole ratio of $H^+$/alkoxide of 0.04.

In some embodiments, the first mixture of small particles is made with a 0.5 h hydrolysis time and peptization uses nitric acid at the mole ratio of $H^+$/alkoxide of 0.13. The concentration of the original sol obtained is generally in the range of from 0.70 to 1.0M.

First mixtures with different boehmite particle sizes can be obtained by mixing first mixtures of different particle sizes and adjusting the particle size can be done with the addition of different polymer binder solutions and adjusting pH value of the mixture.

The polymer binder can be used as anti-cracking additive. In some embodiments, the polymer binder solution is prepared by dissolving a quantity of polymer binder powder such as PEG (polyethylene glycol) or PVA (polyvinyl alcohol) in D.I. water at room temperature or at a temperature of from 60 to 80° C. with or without addition of acid.

The sol concentration in the first mixture after particle size adjustment, in some embodiments, is from 0.1 to 0.4M, while the PVA or PEG concentration is about from 0.3 to 1.0% by weight.

The coating process enables the first mixture after particle size adjustment contact with the inner channel surfaces of the inorganic porous support and the first mixture deposit the surfaces. The coating can be executed using dip-coating, flow-coating or other coating methods. Membrane materials are transported from the liquid fluid onto the channel wall and deposited on the wall surface, leaving an intact deposition layer after the fluid is discharged.

In one embodiment, drying is executed for from 15 to 25 hours at room temperature or higher, for example, at a temperature of 120° C. or less. Temperature can be adjusted according to volatilities of the components in the first mixture. Drying can be performed in an air environment or in an inert environment, for example, using nitrogen, argon, or a combination thereof. In some embodiments, a humidity of from 60-90% is used.

Firing, according to some embodiments, is executed for from 2 to 10 hours having a peak temperature of from 600 to 900° C. with a heating rate and cooling rate of from 0.5 to 2.0° C./min. Firing can be performed in an air environment or can utilize other feed gases, such as nitrogen, oxygen, or a combination thereof. During firing, the polymer binder is removed. Also, the boehmite is decomposed and gamma-alumina is formed. In some embodiments, drying and firing are combined.

In one embodiment, coating-drying-firing can be repeated using the same or different first mixtures after adjusting the particle size.

Example 1

Preparation of the First Mixture

In this example, the first mixture was a colloidal boehmite sol comprising large boehmite particles prepared using aluminum isopropoxide and acetic acid as the alumina precursor and peptization agent respectively.

600 milliliters (ml) of deionized water was heated up to 80 Celsius (° C.) and a quantity of 81.76 grams (g) (0.40 mol) of aluminum isopropoxide (AIP) powder, available from Aldrich, was then added. Before the addition, the AIP powder was ground into fine particles using a porcelain mortar and pestle. This combination was then stirred by a magnetic stirring bar at a high speed and was maintained at a temperature of from 80° C. to 85° C. for 24 hours, allowing hydrolysis of the aluminum alkoxide, and forming a white precipitate. The precipitate was then heated to above 90° C. and the container was opened for evaporation of the as-produced alcohol. The alcohol could be collected by using a rotary evaporator. After 1 to 2 hours of evaporation, the container was closed, and the temperature was kept at around 92° C. with refluxing. After 1 hour of stabilization, the precipitate was peptized with 0.96 g (0.016 mol) of 100% acetic acid, available from Fisher Scientific. The molar ratio of $H^+$/Al was 0.04. The mixture was kept at a temperature of from 90° C. to 95° C. with refluxing for 20 hours resulting in a slightly translucent sol.

The sol concentration was determined to be 0.87 M by measuring the volume of the sol. The pH value of the sol was measured by a pH meter, available from HACH, model HQ40d, to be 4.4. A dynamic light scattering analyzer, available from Nanotrac, Microtrac Inc. was used to measure the particle size distribution of the sol. The obtained first mixture had a median particle size of 1100 nm and the particle size distribution 10 as shown in FIG. 1.

Another first mixture, a colloidal boehmite sol comprising fine particles, was prepared using aluminum tri-sec-butoxide as the alumina precursor and nitric acid as a peptization agent. The same method as described above was used. 98.53 g of aluminum tri-sec-butoxide was hydrolyzed for 0.5 h by 600 ml of deionized water at a temperature of from 80° C. to 85° C., and then this combination was peptized at about 92° C. for 20 h with 4.918 g of concentrated nitric acid (68-70%, TME™). The molar ratio of $H^+/Al$ was 0.13. The sol concentration was 0.8M and the pH value of the sol was 3.7. The resulting sol had a median particle size of 70 nm and the particle size distribution 12 is shown in FIG. 1.

Example 2

Adjusting the Particle Size

This example describes a adjusting the particle size of the first mixture which is, in this example, adjusting the particle size of the original sol of large boehmite particles described in Example 1. Polyvinyl alcohol (PVA) was used as the polymer binder, in this example.

First, a PVA solution containing 4.0% by weight was prepared by dissolving PVA flats into deionized water. 190 ml of deionized water was heated up to a temperature of from 50° C. to 60° C., and then 8.0 grams of PVA was added to the water. The mixture was stirred using a magnetic stirring bar, followed by addition of 10 ml of 1M $HNO_3$ solution. The PVA solution was ready once the PVA was completely dissolved in the water and a clear solution was obtained.

Second, a 600 ml mixture was made by mixing the first mixture comprising large boehmite particles from Example 1 with deionized water and PVA solution. 184 ml of deionized water was stirred and heated up to a temperature of from 60° C. to 80° C. and 140 ml of 4% PVA solution was added. Then, 276 ml of the first mixture was poured into the above described combination. After mixing for from 2 to 4 hours, the mixture was obtained with a sol concentration of 0.4M and 0.9 wt % PVA. After cooling, the mixture was characterized with a pH value of 3.8 and a median particle size of 190 nm.

Figure 2:
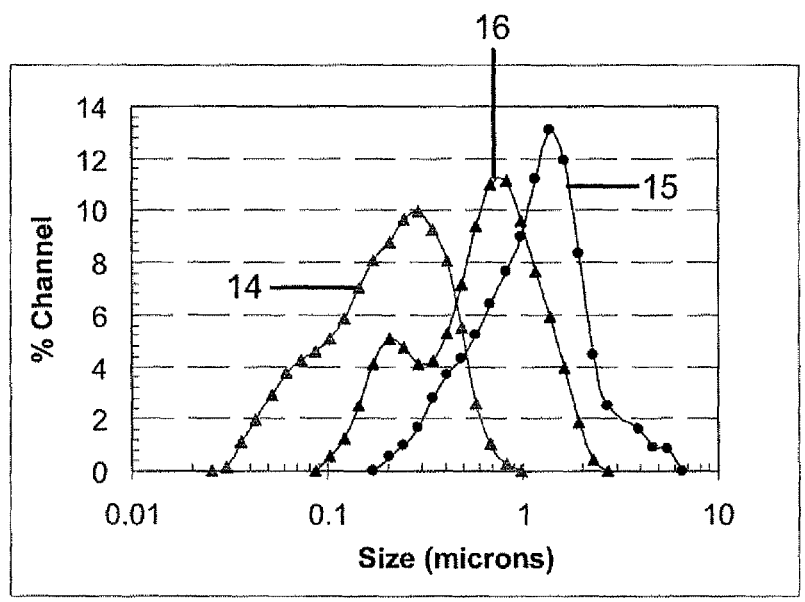
FIG. 2 is a graph showing the change of the particle size distribution after adjusting the particle size of the first mixture.

The particle size distribution 14 is shown in FIG. 2. The median particle size of the boehmite particles in the first mixture, shown by line 15, was reduced from 1100 nm to 190 nm after adjusting the particle size via dilution and mixing with acidic PVA solution. The large aggregate boehmite particles were broken up into small particles by dilution and by reducing the pH value.

Figure 3:
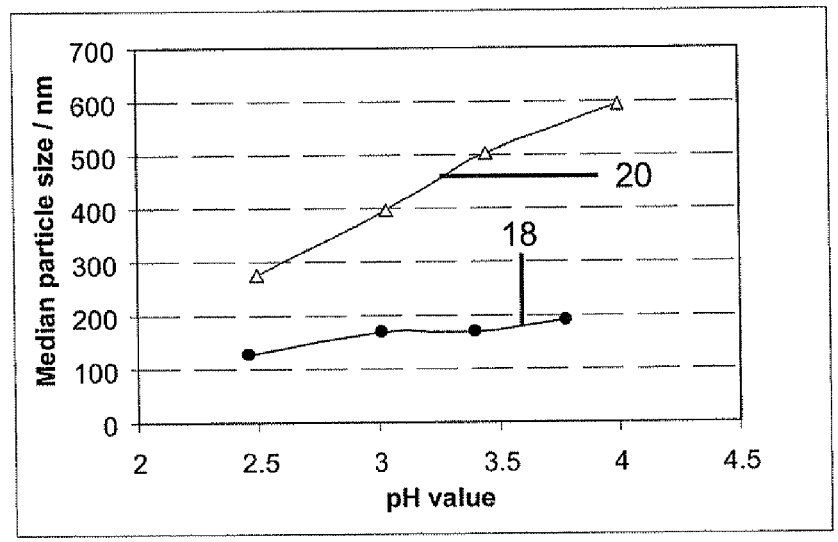
FIG. 3 is a graph showing the dependence of aggregate particle size in the first mixture on different polymer binders and pH values of the solutions.

FIG. 3 shows the dependence of the median boehmite particle size of the first mixtures with varied pH values for PVA, shown by line 18 and for PEG, shown by line 20 in which the pH was adjusted with addition of 1M $HNO_3$ solution or concentrated $HNO_3$ solution. The median particle size was decreased from 600 nm to 280 nm with reducing pH from 4.0 to 2.5. As compared to the solution containing PVA, the solution with PEG has large boehmite particles at the same pH value.

Example 3

Adjusting the Particle Size

In this example, polyethylene glycol (PEG) was used as the polymer binder. The same original boehmite sol first mixture was used as in Example 2.

First, a PEG solution containing 20.0% by weight was prepared by dissolving PEG solids into D.I. water. 40.0 grams of PEG was added to 200 ml of D.I. water. The mixture was stirred for from 4 to 6 hours until the PEG was completely dissolved in the water and a clear solution was obtained.

Second, a 600 ml mixture was made by mixing the original sol with D.I. water and the PEG solution. 263 ml of D.I. water was stirred and heated up to a temperature of from 50° C. to 60° C., and 61 ml of the 20% PEG solution and 276 ml of the original sol were added in.

The pH value of the mixture was adjusted to 4.0 with addition of 13 drops of 1M $HNO_3$ solution. After mixing for from 2 to 4 hours, the mixture was obtained with a sol concentration of 0.4M and 0.4 wt % PEG. After cooling, the mixture was characterized with a median particle size of 600 nm and the particle size distribution as shown by line 16 in FIG. 2.

Example 4

Adjusting the Particle Size

Figure 4:
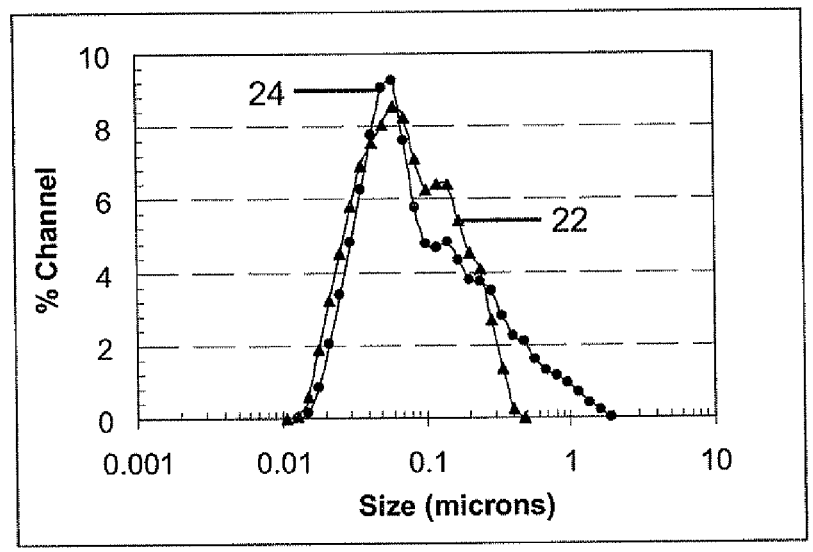
FIG. 4 is a graph showing the change of the particle size distribution after adjusting the particle size of the first mixture.

In this example, a mixture was prepared by mixing the first mixture, the original sol comprising small boehmite particles from Example 1 with a PVA solution. A 600 ml mixture was made according to the same method as described above by mixing 150 ml of the first mixture with 380 ml of D.I water and 70 ml of 4 wt % PVA solution. The first mixture after adjusting the particle size had a pH of 3.7 and a sol concentration of 0.2M and PVA concentration of 0.47 wt %. The median boehmite particle size was 60 nm with a particle size distribution as shown by line 22 in FIG. 4. Compared to the first mixture 24, the particle size distribution after adjusting the particle size of the mixture became narrower, since large aggregate particles were broken up due to dilution.

Example 5

Inorganic Porous Supports

The inorganic porous supports, used in the inorganic membrane examples described below, comprise a first end, a second end, and a plurality of inner channels having surfaces defined by porous walls and extending through the support from the first end to the second end. The supports are in the form of a honeycomb monolith. The supports were made of alpha-alumina and had an outer diameter ranging from 8.7 to 10.0 mm and a length of 75 mm. The supports had 19 rounded channels having an average diameter of 0.75 mm and being uniformly distributed over the cross sectional area. The median pore size of the supports was from 8.4 to 8.7 µm, and the porosity was from 43.5 to 50.8% as measured by mercury porosimetry.

Figures 5A, 5B:
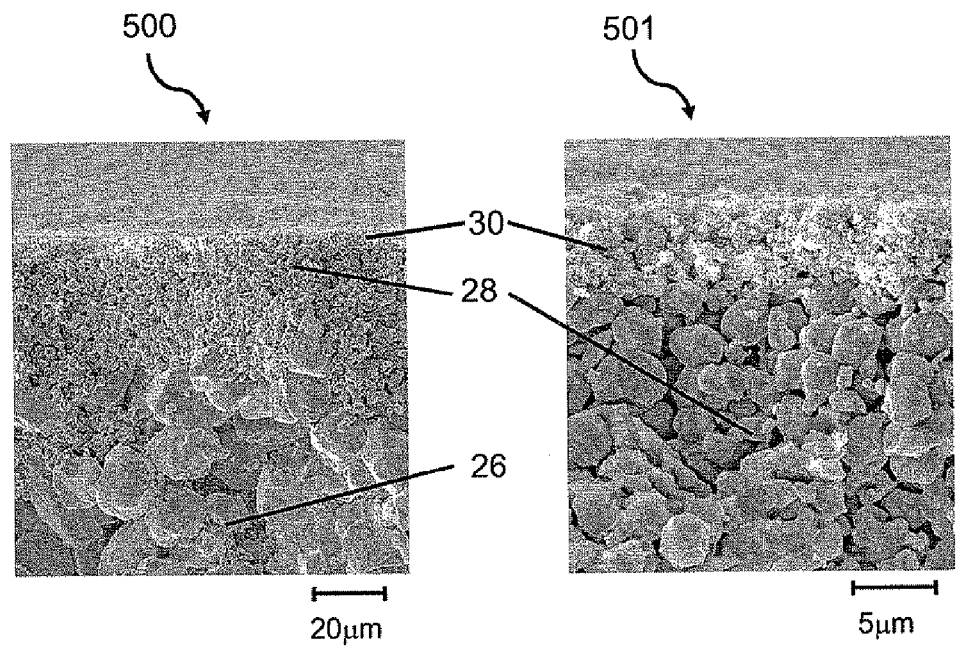
FIG. 5*a* and FIG. 5*b* are scanning electron microscope (SEM) cross sectional images of an inorganic porous support made according to one embodiment.
Figure 6:
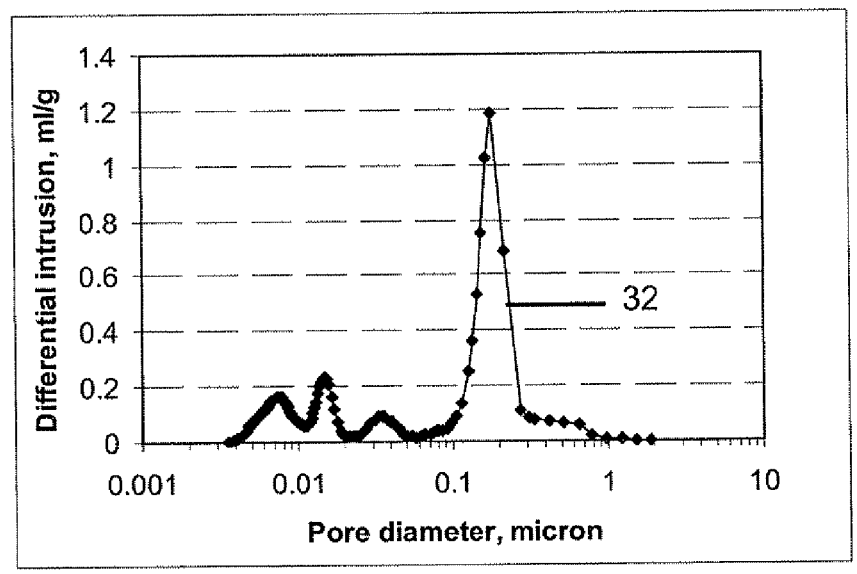
FIG. 6 is a graph showing the pore size distribution of the top alpha-alumina layer of the inorganic porous support made according to one embodiment.

The inorganic porous support used in the inorganic membrane examples described below comprised at least one inorganic porous intermediate layer on the inner channel surfaces. The inorganic porous intermediate layers comprised two porous alpha-alumina layers with the mean pore size reducing from about 800 nm to about 170 nm. The layers were made with a slip coating method. FIG. 5a and FIG. 5b are scanning electron microscope (SEM) cross sectional images of the inorganic porous support 500 and the same inorganic porous support at a higher magnification 501, respectively. The first inorganic porous intermediate layer 28 and second inorganic porous intermediate layer 30 have a thickness of 30 µm and 5 µm, respectively and are on the inner channel surfaces 26. FIG. 6 shows the pore size distribution, line 32, of top alpha-alumina layer with a median pore size (d50) of 180 nm and porosity of 52.6%.

Example 6

Preparation of Inorganic Membranes

This example describes the process of making gamma-alumina membranes using different coating solutions with the same sol concentration but different particle sizes, and the effect of boehmite particle size on the membrane coating quality. The inorganic porous supports as described in Example 5 were used. The membrane was coated on the inner channel surface of the supports.

A flow-coater was used to deposit the boehmite sol layer on the inner channel surface of the inorganic porous support. The 75 mm inorganic porous support having a pore size of around 160 nm was mounted into the flow coater, and then the 0.4M mixture #1 was sucked into the channels of the support by pressure difference. The soaking time was 20 seconds. The coated support was spun for 60 seconds at a speed of 725 rpm to remove excess coating mixture in the channels, dried at 120° C. for 2 hours, and fired at 650° C. for 2 hours at a heating rate of 1° C./min. The same procedure was repeated using the other 5 mixtures described in Table 1, respectively.

Figure 7:
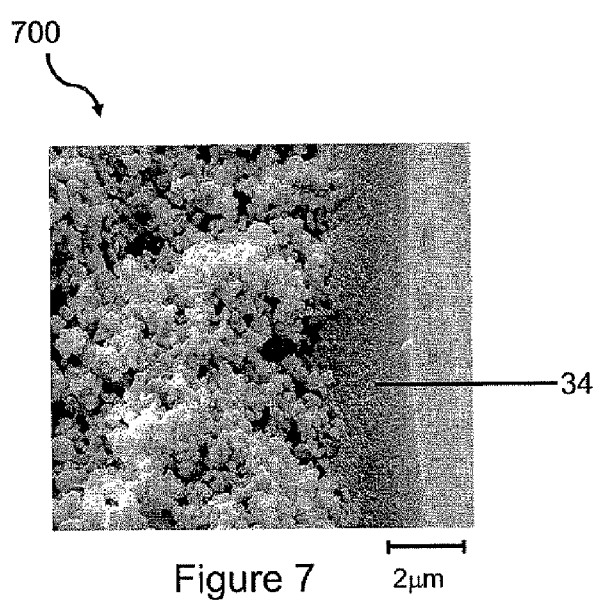
FIG. 7 is an SEM cross sectional image of a gamma-alumina membrane made according to one embodiment.

The coating quality of the resulting 6 samples was analyzed by SEM. The results after one coating are listed in Table 1. It was found that a continuous inorganic membrane coating could be formed by a single coating of the 0.4M coating mixture comprising of sol particle size d50 large up to 170 nm, which was very close to the median pore size of the support. When the particle size was smaller than the pore size such as 140 nm for coating mixture #2, a partial membrane coating was observed. As shown by the cross sectional SEM of the inorganic membrane 700 in FIG. 7, a continuous membrane 34 was formed with one more coating of 0.4M mixture #2.

TABLE 1

| Mixture # | Sol conc. (M) | Sol particle size, d50 (nm) | pH value | Polymer binder | Formation of continuous coating |
|---|---|---|---|---|---|
| 1 | 0.4 | 127 | 2.5 | PVA | No |
| 2 | 0.4 | 140 | 3.5 | PVA | No |
| 3 | 0.4 | 170 | 3.5 | PVA | Yes |
| 4 | 0.4 | 191 | 4.0 | PVA | Yes |
| 5 | 0.4 | 500 | 3.5 | PEG | Yes |
| 6 | 0.4 | 600 | 4.0 | PEG | Yes |

Example 7

Preparation of and Gas Permeation Properties of Inorganic Membranes

This example describes the synthesis of three gamma-alumina membranes and their corresponding gas permeation properties. All three membranes were prepared by three cycles of coating-drying-firing, the first two of which used different coating mixtures comprising different sol particle size and the last of which used the same coating mixture.

The first coating of three membranes was conducted by the flow-coating technique as described in Example 6. Three coating mixtures comprising different sol particle sizes were used, as listed in Table 2, including a conventional solution, 0.6 M-CS60-PVA. After coating, drying and firing, the same procedure was repeated using the same mixture as for the first coating as the second mixture. The third coating of the membranes was conducted by using the same coating mixture as described in Example 4.

TABLE 2

| Membrane # | Solutions for 1st two coatings | Sol conc. (M) | Sol particle size, d50 (nm) | pH value | Anti-cracking agent |
|---|---|---|---|---|---|
| 1 | 0.6M-CS60-PVA | 0.6 | 60 | 3.6 | PVA |
| 2 | 0.4M-CS140-PVA | 0.4 | 140 | 3.5 | PVA |
| 3 | 0.4M-CS600-PEG | 0.4 | 600 | 4.0 | PEG |

The gas permeation properties were conducted at 600° C. by measuring the flow rate of tested gas flowing through the membrane. First, the monolith membrane sample was assembled in a membrane testing module with graphite ferrules. Then, the module was heated up to 600° C. at a heating rate of 1° C./min with Ar or $N_2$ flowing through both the tube side and the shell side. After from 5 to 6 hours of stabilization, the test was conducted with a dead-end mode. Each membrane was tested with He and $N_2$, respectively.

The permeation results are shown in Table 3. It can be seen that the membrane made with larger sol particles has higher permeance for He and $N_2$, indicating that the membrane is more permeable. On the other hand, the permselectivity of He to $N_2$ for the membranes, which is defined as the ratio of He permeance to $N_2$ permeance, was similar and close to the value predicated by the Knudsen diffusion mechanism, implying no macro-size defects in all three membranes.

TABLE 3

| Membrane # | Solutions for 1st two coatings | Sol particle size, d50 (nm) | Permeance at 600° C., sccm/cm²/bar | | Permselectivity, He/N₂ |
|---|---|---|---|---|---|
| | | | He | N₂ | |
| 1 | 0.6M-CS60-PVA | 60 | 158 | 74 | 2.14 |
| 2 | 0.4M-CS140-PVA | 140 | 210 | 99 | 2.10 |
| 3 | 0.4M-CS600-PEG | 600 | 401 | 187 | 2.15 |

Embodiments of the present invention provide a practical method of making thin mesoporous membranes with less infiltration. Both the thin layer of mesoporous membrane and less infiltration enables achievement of high permeation flux and meanwhile reduces the risk of cracking and pinhole problems. Higher thermal shock resistance is also evident due to the thin layer character of the membrane facilitating less build up of stresses. The use of lower permeation flow resistance inorganic porous supports can allow higher overall permeance after the formation of the inorganic membrane.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A method comprising:
providing a monolith comprising a first end, a second end, and a plurality of inner channels having surfaces defined by porous walls and extending through the monolith from the first end to the second end, wherein the inner channels each have a hydraulic inside diameter of 3 mm or less;
providing a first mixture comprising boehmite particles;
adjusting the particle size of the boehmite particles in the first mixture; and
flow-coating the first mixture to the inner channel surfaces of the monolith to form an inorganic membrane after adjusting the particle size.

2. The method according to claim 1, wherein adjusting the particle size comprises adjusting the median particle size.

3. The method according to claim 1, wherein applying the first mixture comprises drying and firing the boehmite particles to form gamma-alumina.

4. The method according to claim 3, further comprising:
providing a second mixture comprising boehmite particles;
adjusting the particle size of the boehmite particles in the second mixture; and
applying the second mixture to the inorganic membrane after the drying and firing of the boehmite particles of the first mixture and after adjusting the particle size of the boehmite particles in the second mixture.

5. The method according to claim 4, wherein adjusting the particle size comprises adjusting the median particle size.

6. The method according to claim 4, wherein the adjusted median particle size of the boehmite particles in the second mixture is smaller than the adjusted median particle size in the first mixture.

7. The method according to claim 4, wherein applying the second mixture comprises drying and firing the boehmite particles to form gamma-alumina.

8. The method according to claim 4, wherein adjusting the particle size of the boehmite particles in the second mixture comprises controlling the pH value of the second mixture.

9. The method according to claim 1, wherein providing the first mixture comprising boehmite particles comprises preparing a sol.

10. The method according to claim 9, wherein preparing the sol comprises hydrolysis and condensation.

11. The method according to claim 1, wherein adjusting the particle size of the boehmite particles in the first mixture comprises controlling the pH value of the first mixture.

12. The method according to claim 1, wherein adjusting the particle size of the boehmite particles in the first mixture comprises combining the first mixture with a polymer binder, a solution comprising a polymer binder, an acid, acetic acid, nitric acid, or a combination thereof.

13. The method according to claim 12, wherein the polymer binder is selected from polyethylene glycol, polyvinyl alcohol, and combinations thereof.

14. The method according to claim 12, wherein the solution comprising the polymer binder comprises water, distilled water or a combination thereof.

15. The method according to claim 1, wherein the adjusted particle size of the boehmite particles in the first mixture is larger than the pore size of monolith.

16. The method according to claim 1, wherein the inorganic porous support is a honeycomb monolith.

17. The method according to claim 1, wherein the monolith comprises a material selected from alumina, alpha-alumina, gamma-alumina, zirconia, ceria, titania, mullite, cordierite, perovskite, stainless steel, and combinations thereof.

18. The method according to claim 1, wherein monolith comprises at least one inorganic porous intermediate layer on the inner channel surfaces.

19. The method according to claim 18, wherein the adjusted median particle size of the boehmite particles in the first mixture is larger than the median pore size of the at least one inorganic porous intermediate layer.

20. The method according to claim 18, wherein the at least one inorganic porous intermediate layer comprises alpha-alumina, zirconia, titania, ceria, mullite, cordierite, perovskite, or combinations thereof.

* * * * *